(12) United States Patent
Jacob et al.

(10) Patent No.: US 7,241,425 B2
(45) Date of Patent: Jul. 10, 2007

(54) FLUIDIZED BED APPARATUS FOR BATCH-BY-BATCH OR CONTINUOUS PROCESS CONTROL AND METHOD FOR OPERATING A FLUIDIZED BED APPARATUS

(75) Inventors: Michael Jacob, Weimar (DE); Karlheinz Rümpler, Weimar (DE); Mike Waskow, Weimar (DE)

(73) Assignee: Glatt Ingenieurtechnik GmbH, Weimar (DE)

( * ) Notice: Subject to any disclaimer, the term of this patent is extended or adjusted under 35 U.S.C. 154(b) by 507 days.

(21) Appl. No.: 10/756,093

(22) Filed: Jan. 13, 2004

(65) Prior Publication Data
US 2005/0152815 A1    Jul. 14, 2005

(51) Int. Cl.
*B32B 5/02* (2006.01)

(52) U.S. Cl. ............... 422/145; 422/139; 422/141; 422/142; 422/143

(58) Field of Classification Search ............ 422/139, 422/141, 142, 143, 145
See application file for complete search history.

(56) References Cited

U.S. PATENT DOCUMENTS
5,395,449 A    3/1995    Quadir et al. ............... 118/303

FOREIGN PATENT DOCUMENTS

| DE | 34 00 397 A1 | 11/1984 |
|---|---|---|
| DE | 100 04 939 C1 | 8/2001 |
| DE | 10162781 A1 * | 7/2003 |
| EP | 0 857 930 A1 | 2/1998 |
| GB | 736036 | 8/1955 |
| WO | 01/43861 A1 | 6/2001 |

* cited by examiner

*Primary Examiner*—Basia Ridley
(74) *Attorney, Agent, or Firm*—Volpe and Koenig, P.C.

(57) ABSTRACT

A fluidized bed apparatus for batch-by-batch or continuous process control is provided that allows the processes in the fluidization region to be influenced as desired, especially in terms of material movement and dwell time. The fluidized bed apparatus is formed from at least two processing regions and the processing regions are connected to each other by overflow channels. The first processing region is provided with a solids inlet and the last processing region is provided with a solids outlet. For influencing the dwell time, the material to be treated is supplied to at least two processing regions one after the other and flows through these regions, wherein the material transport direction is a cross flow relative to the flow of the fluidization means.

8 Claims, 7 Drawing Sheets

FLUIDIZED BED APPARATUS FOR BATCH-BY-BATCH OR CONTINUOUS PROCESS CONTROL AND METHOD FOR OPERATING A FLUIDIZED BED APPARATUS

The invention relates to a fluidized bed apparatus for batch-by-batch or continuous process control of the type having a fluidized bed apparatus formed essentially from one air inlet chamber, one fluidization region, and one gas outlet, with a gas flow device arranged in the region between the air inlet chamber and the fluidization region for supplying fluidization means. The fluidization region is formed by the at least one gas flow device, one jet inlet wall, and one opposite jet return flow wall, as well as the side walls, wherein the jet inlet wall and the jet return flow wall are inclined relative to the vertical such that they form a cone. The fluidized bed apparatus, which forms the processing region can be configured to be one-sided or two-sided, in which a double-sided fluidized bed apparatus, which is formed by two gas flow devices and the corresponding jet inlet walls, jet return flow walls, as well as the side walls, includes an expanded cross section of the fluidized bed apparatus above the jet inlet walls and jet return flow walls, where the outlet for the outgoing air is arranged.

The invention also relates to a method for operating a fluidized bed apparatus, for which there is a batch-by-batch or continuous process control for fluidization and heat treatment of essentially randomly shaped particles with arbitrary dimensions as well as masses. The material to be treated is fluidized in the processing region in a particle flow, and the fluidization means are supplied through a controllable gas flow device from below the processing region.

A fluidized bed apparatus for fluidization and heat treatment of essentially randomly shaped materials with different particle dimensions and particle masses is known from the publication DE 100 04 939 C1. The fluidized bed apparatus for batch-by-batch or continuous process control consists of an air inlet chamber, which is arranged in the lower region of the fluidized bed apparatus and into which the fluidization means, e.g., air, is fed. The fluidization means are supplied to the fluidization region of the fluidized bed apparatus by means of a controllable gas flow device arranged between the air inlet chamber and the fluidization region. The fluidization region is formed by the gas flow device arranged in the lower region and also by a jet inlet wall, a jet return flow wall opposite the jet inlet wall, and also the side walls. The jet inlet wall and the jet return flow wall are inclined relative to the vertical, so that they form a cone. Therefore, above the jet inlet wall and the jet return flow wall, the fluidized bed apparatus has an expanded cross section, which is used as an expansion region for the fluidization means and which is provided with an outlet for the outgoing air. The fluidized bed apparatus thus can be one-sided or two-sided, i.e., it can be formed with a double cone. By the arrangement of the jet inlet wall and the jet return flow wall, as well as by the supply of fluidization means through the gas flow device, a kind of solids rotation, during which an appropriate material treatment is performed, takes place in the fluidization region.

A disadvantage for the described fluidized bed apparatus is that the process to be performed can be influenced as desired only to a small degree in the fluidization region. The dwell time behavior of the material for continuous process control can be influenced only within small limits.

SUMMARY

The object of the invention is to configure a fluidized bed apparatus for batch-by-batch or continuous process control and a method for operating a fluidized bed apparatus of the type described in the introduction, such that the process can be influenced as desired in the fluidization region, especially in terms of targeted material movement and dwell time effects.

The object is achieved by forming the fluidized bed apparatus with at least two processing regions, and the processing regions are connected to each other by an overflow channel inlet and the last processing region is provided with a solids outlet.

The associated method for operating the fluidized bed apparatus is achieved in that for influencing the dwell time, the material to be treated is fed to two processing regions one after the other and passes through these regions, wherein the material transport direction (F) is realized relative to the flow of the fluidization means in the cross flow. Advantageous configurations of the device and the method are given in the subordinate claims.

Through the arrangement of several known fluidized bed apparatuses with different configurations and adjustable processing conditions, the dwell time and also the processing conditions in the individual processing regions can be adjusted for continuous process control. Through a corresponding arrangement of individual processing regions one behind the other and/or one next to the other, which are connected to each other by overflow channels, a targeted material movement is achieved in the fluidized bed apparatus. This simultaneously influences the dwell time in the fluidized bed apparatus. By setting the flow rate, the temperature, and the volume of the supplied fluidization means, the processing conditions in the individual processing regions can be set corresponding to the conditions required for the material treatment. Therefore, the device according to the invention and the method according to the invention can be used for treating different materials under appropriate conditions that are set with reference to the fluidization and heat treatment of essentially randomly shaped particles with arbitrary dimensions and also masses.

BRIEF DESCRIPTION OF THE DRAWINGS

The invention is explained in more detail with reference to exemplary embodiments. Shown in the associated drawings are.

DETAILED DESCRIPTION OF THE PREFERRED EMBODIMENTS

Figure 1:
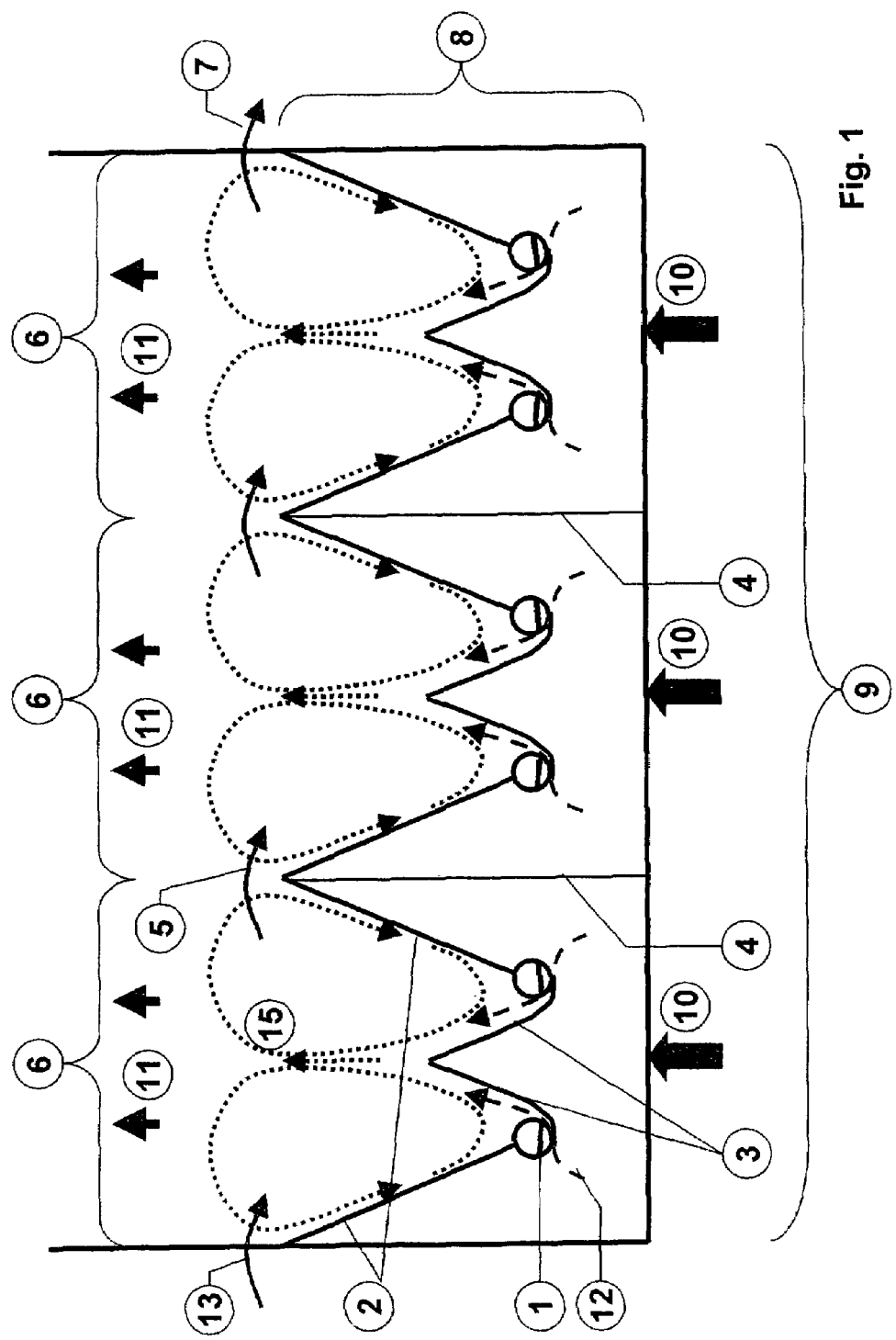
FIG. 1 is a schematic representation of the fluidized bed apparatus according to the invention.
Figure 3:
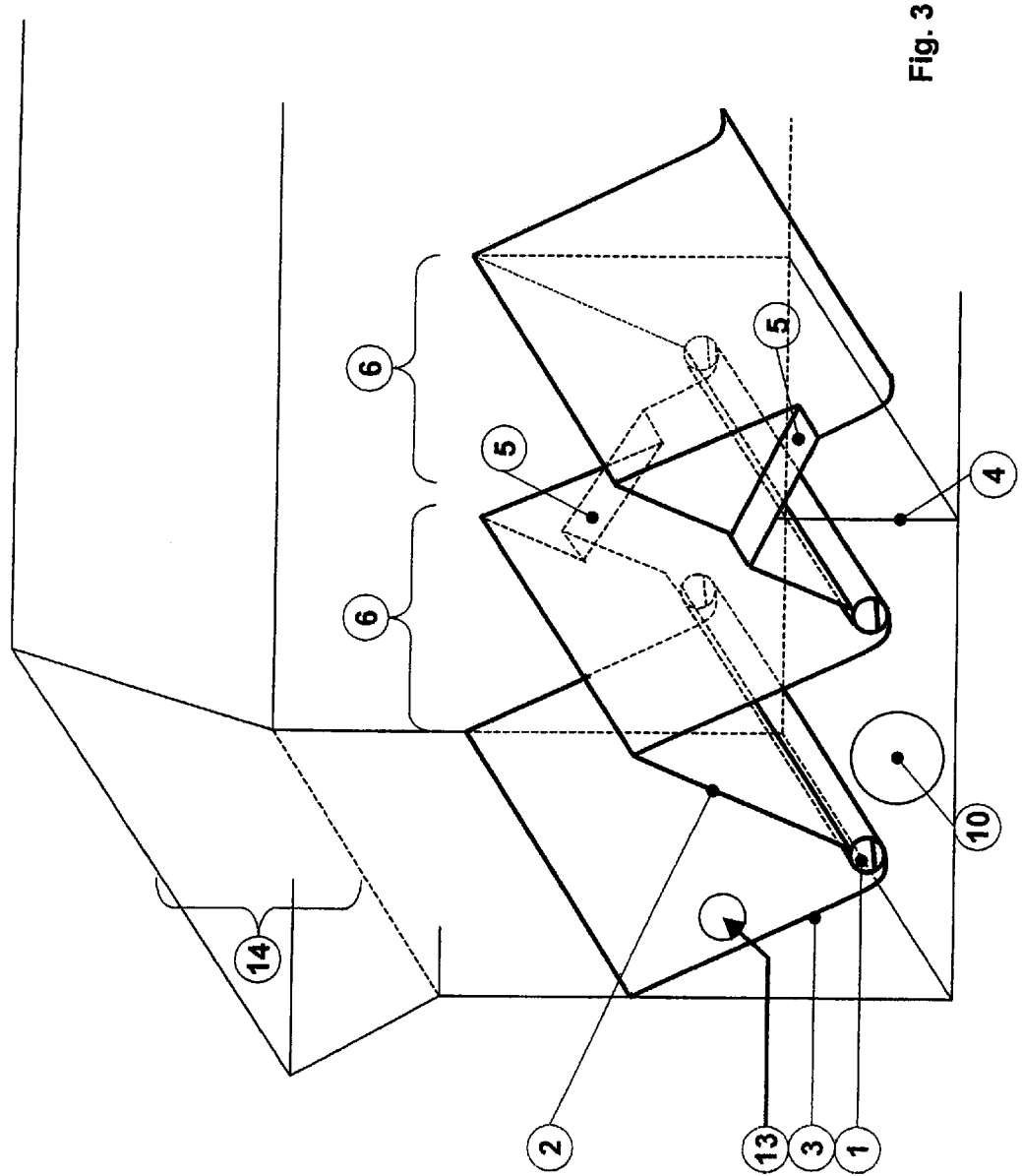
FIG. 3 is a perspective view of an alternate embodiment of the fluidized bed apparatus according to the invention.

FIG. 1 shows a fluidized bed apparatus according to the invention, which includes at least two processing regions 6 arranged one after the other. The processing region 6 are formed of a known fluidized bed apparatus, which is formed from an air inlet chamber 8, two gas flow devices 1, the corresponding jet inlet walls 3, jet return flow walls 2, and also the side walls. The jet inlet walls 3 and the jet return flow walls 2 are inclined relative to the vertical such that they form a double cone. In FIG. 3, the processing region 6 is represented as a one-sided fluidized bed apparatus with only one gas flow device 1, one jet inlet wall 3, and one opposite jet return flow wall 2, as well as the corresponding side walls. Here, the jet inlet wall 3 and the jet return flow wall 2 form a simple cone.

According to the invention, at least two or more processing regions 6 are arranged in the apparatus cross section 9 such that for continuous or quasi-continuous process control, multi-stage processing is realized. In this way, the solids, which take part in the processing and which enter into the fluidized bed apparatus through a solids inlet 13 arranged at the first processing region 6, pass through several processing regions 6 one after the other until the solids leave the fluidized bed apparatus again by means of a solids outlet 7 at the last processing region 6. Between the individual processing regions 6 arranged one after the other, overflow channels 5 are arranged in the adjacent jet inlet walls 3 and jet return flow walls 2 of adjacent processing regions 6, through which the solids are led into the following processing region 6. The overflow channels 5 can be formed by channels, cross-sectional openings, arbitrary transport systems, or the like.

Due to the multiple stages, a cross flow is produced between the solids transport direction and the flow of the fluidization means, which is produced by the incoming air 10 supplied by the gas flow device 1 and which leaves the processing region 6 as outgoing air 11. The technical configuration of the processing regions 6 can be varied. In FIG. 1, the configuration of the fluidization means inlet is shown by the gas flow device 1 essentially as a symmetrical gap. This means that the fluidization means enters into the fluidized bed apparatus in the lower region as incoming air 10 (for the most part air). Here, the supply direction can be vertical, horizontal, or any arbitrary direction.

It is characteristic that the flow conditions in the air inlet chamber 8 become homogeneous underneath the processing regions 6. The incoming air 10 is distributed to the processing regions 6, flows through the gas flow device 1, and is led into the processing space (fluidization region) above the jet inlet wall 3 and the jet return flow wall 2 in order to establish the particle flow 15. The fluidization means inlets of the gas flow device 1 may be formed from a gap, perforated sheets, etc., or also of throttle baffles, which set the amount of supplied fluidization means.

As a variation of the flow distribution, segmentations 4 can also be inserted into the air inlet chamber 8. Here, it is not absolutely necessary that each processing region 6 is allocated to a separate flow region. The fluidization means enter in the lower part of the processing region 6 as an air flow in the gap cross section 12. Then the means are guided according to the geometry and then flow preferably upwards and entrain the solids contained in the region. Therefore a slightly to highly turbulent particle flow 15 is formed. This can include speed ranges from the solid bed that is passed through up to the limiting region of the flight transport. At higher speeds, a kind of circulating flow forms on the solids side, because the fluidization speed decreases due to expansion in the upper expansion region 14 or in the apparatus parts arranged above, and the solids flow back to the jet return flow walls 2. From there outwards, the solids move back to the fluidization inlet of the gas flow device 1, where they are entrained again by the flow in the direction of the jet inlet walls 3.

An essential feature of the solution according to the invention is that different processing conditions can be set in the individual processing regions 6. Here, the processing conditions in the individual processing regions 6 can be set by the configuration and the size of the corresponding processing regions 6 and/or by different flow speeds, temperatures, and volume flows of the supplied fluidization means.

Figure 2:
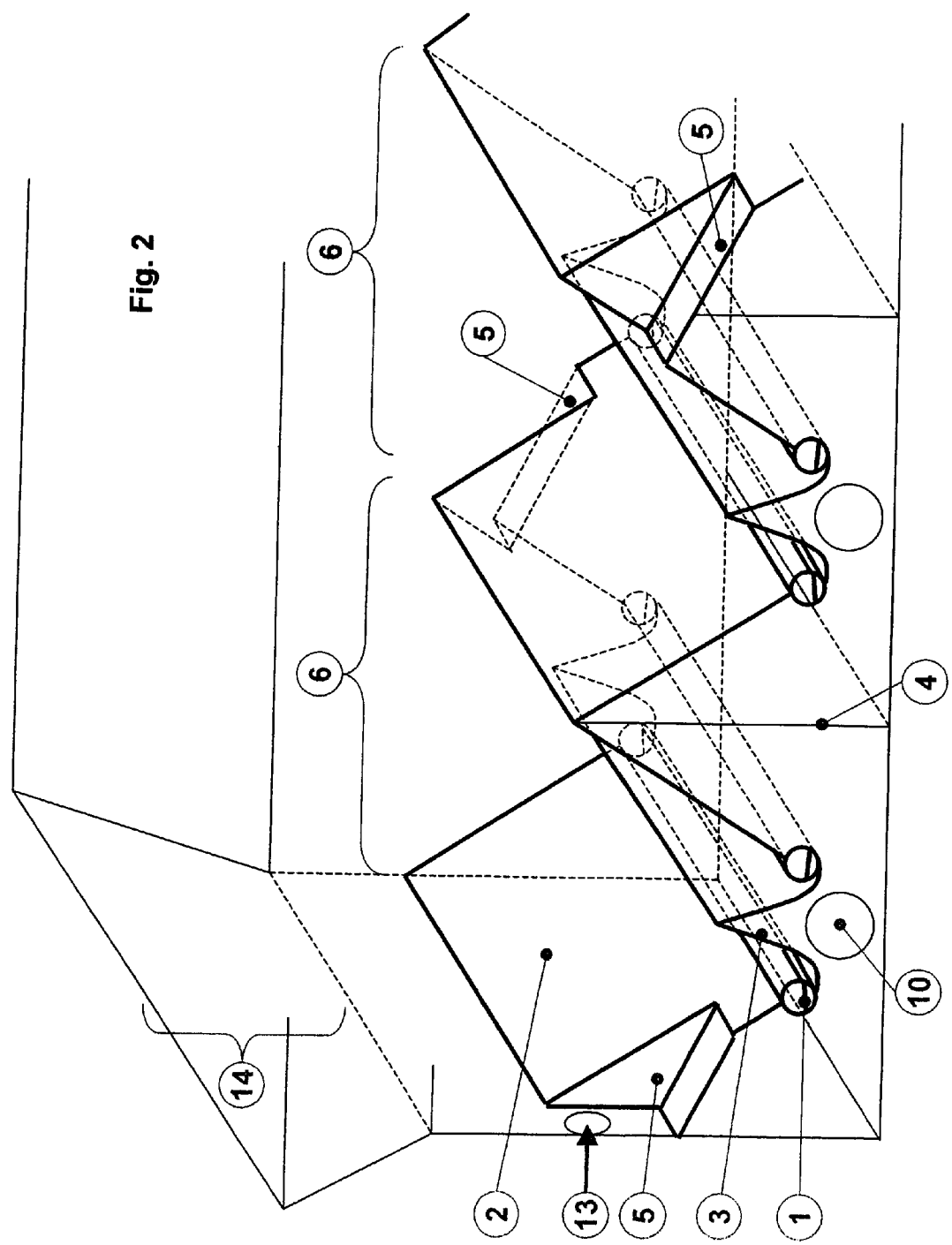
FIG. 2 is a perspective view of the fluidized bed according to the invention.

FIG. 2 shows the configuration of another exemplary embodiment. Overflow channels 5 provide inlets and outlets for solids. In the illustration, it is clear that the solids are fluidized in the processing regions 6. Because the feed material at one end or at a long side enters continuously or quasi-continuously through the solids inlet 13 into the corresponding processing region 6, the solids rotation R is superimposed on the solids movement oriented essentially along the fluidization inlet 1. Therefore, the supplied solids move in the direction of the supply to the subsequent processing region 6. With this means and method, the fluidized particles wander in a meander-like fashion through the apparatus. Therefore, a material flow direction that is as directed as possible is given. The solids leave the processing regions 6 through the solids outlet 7.

Figure 4:
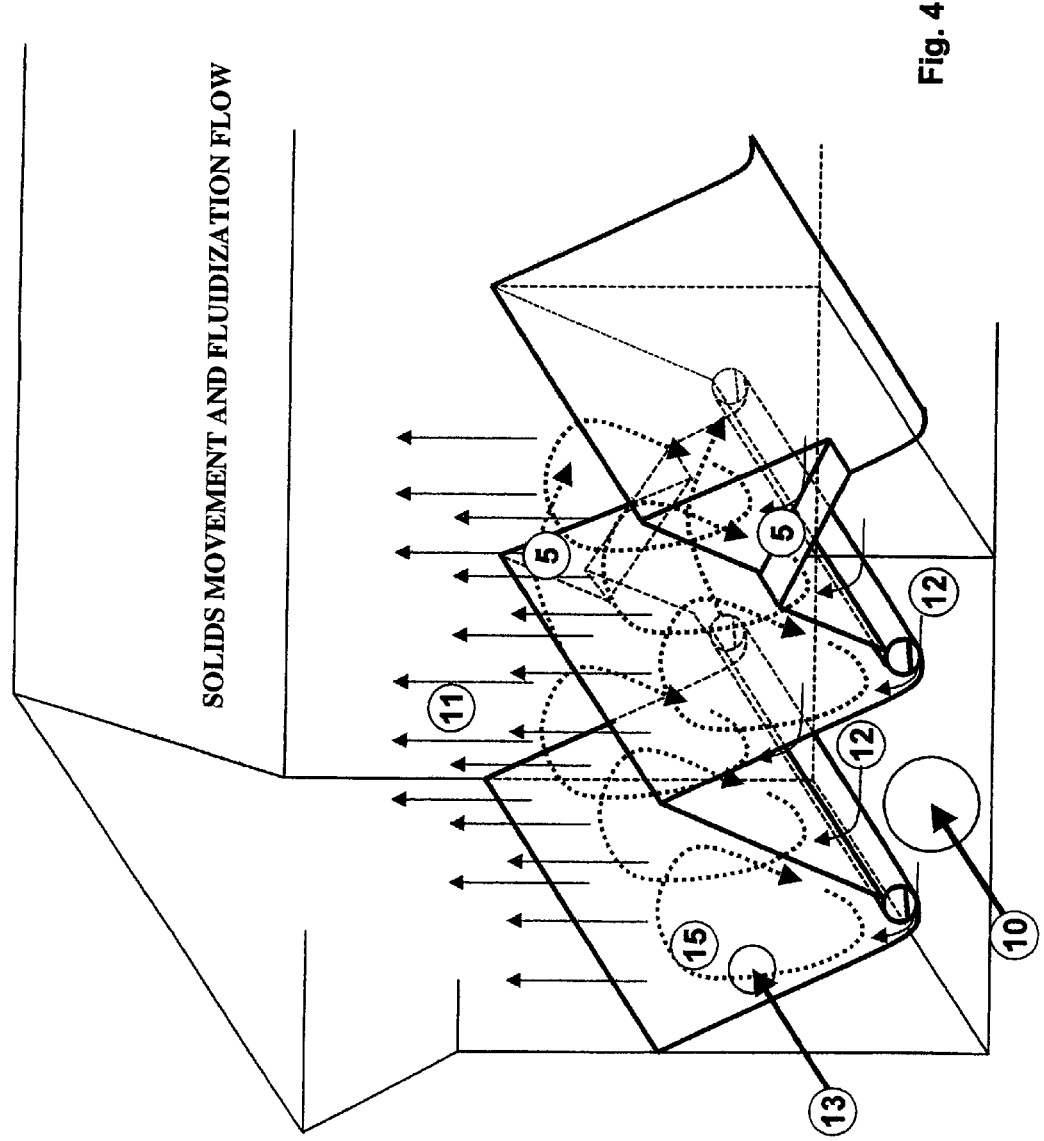
FIG. 4 is a view showing the solids movement and fluidization flow in the fluidized bed apparatus according to the invention.

In FIG. 4, the solids movement and the flow of the fluidization means is shown schematically.

Figure 5:
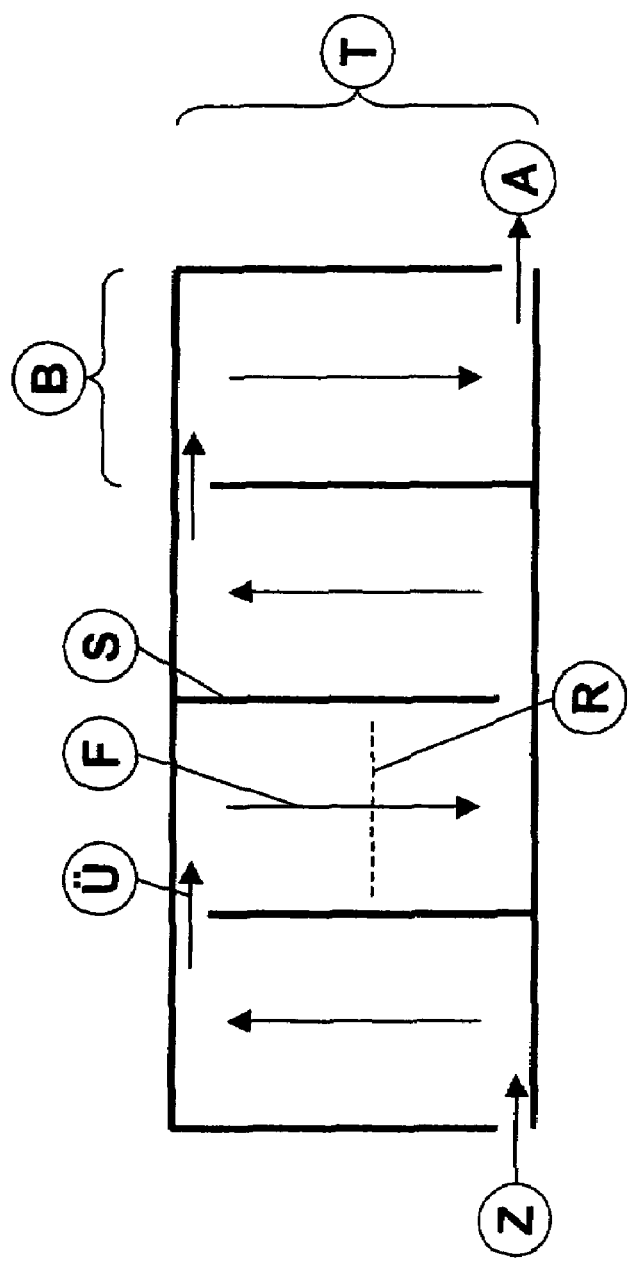
FIGS. 5–7: are views showing variants of the arrangement of several processing regions in the fluidized bed apparatus according to the invention.
Figure 6:
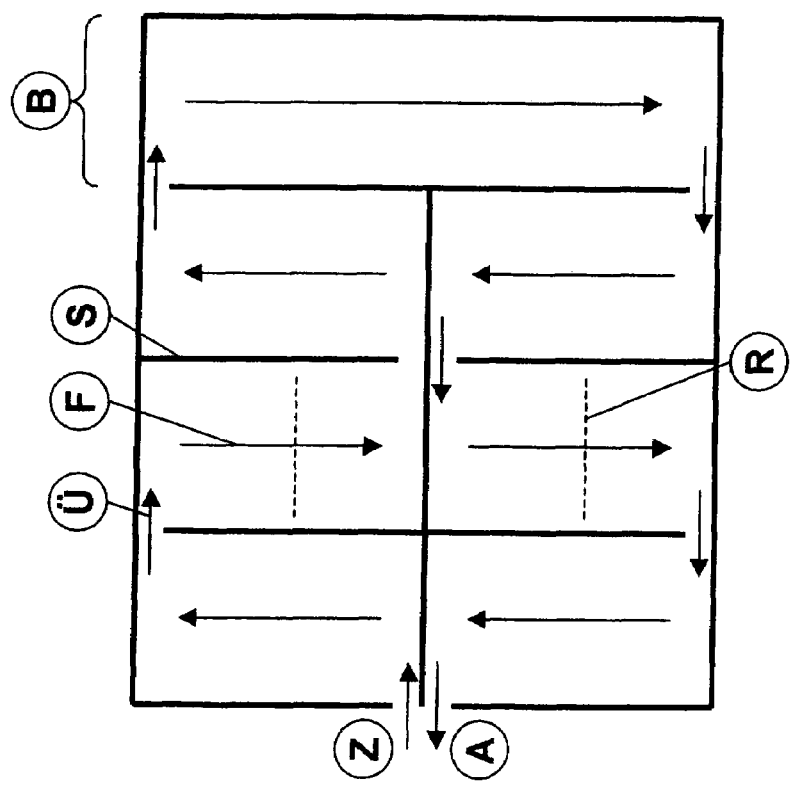
Figure 7:
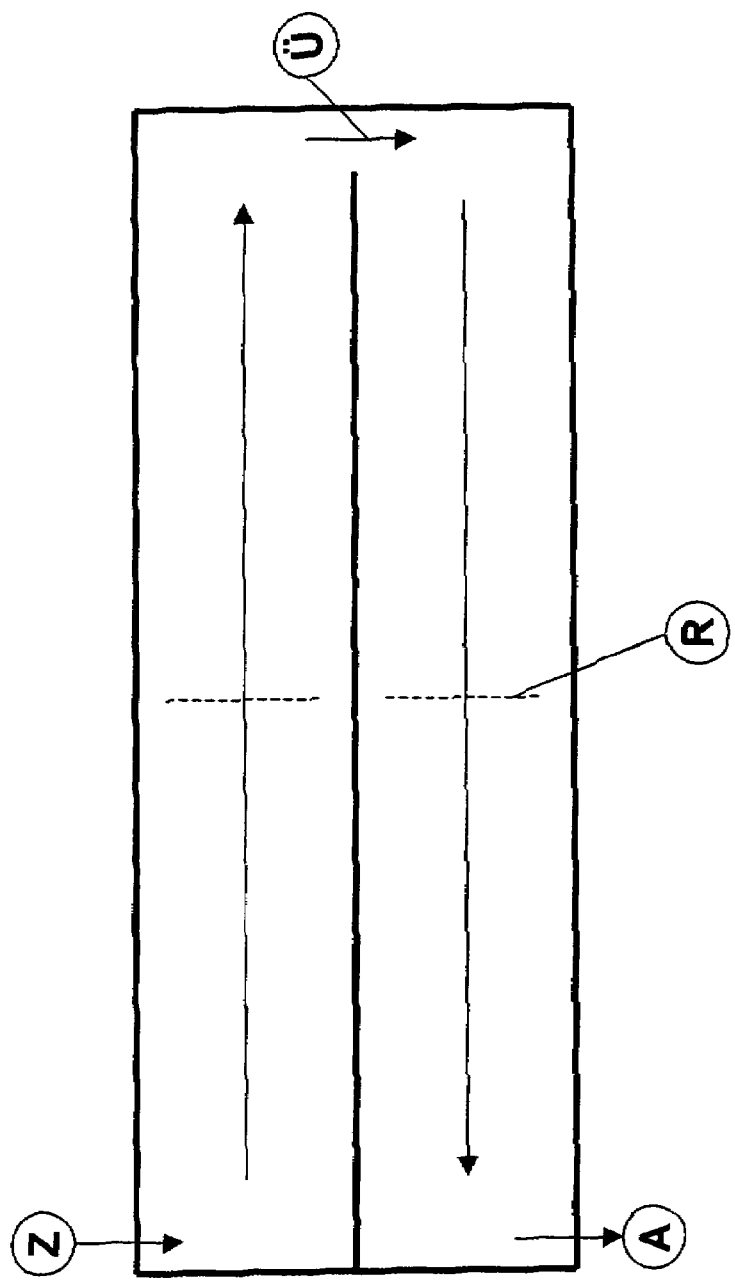

Through the spatial arrangement of processing regions 6, as well as through variation of their geometry, a wide range of solid flows can be realized. FIGS. 5–7 show a few variants. In the individual figures, the solids inlet into the first processing region 6 is shown with Z and the solids outlet from the last processing region 6 as seen in the direction of material flow F is shown with A. The solids overflow channel from one processing region 6 to the next region is shown with Ü. The corresponding segmentation of the air inlet chamber 8 is shown with S, the solids rotation in the processing region 6 is shown with R, and the width and the depth of the processing region 6 are shown with B and T, respectively.

In FIG. 5, several individual processing regions 6 are arranged one after the other, wherein the material is led in a meander-like fashion through the fluidized bed apparatus.

In FIG. 6, several individual processing regions 6 are arranged one after the other and one next to each other, wherein the size of the processing regions 6 is different.

FIG. 7 shows two processing regions 6 arranged next to one another. The variants shown here should not be restrictive, but instead represent only appropriate possibilities. Other arrangements, also in terms of the number of individual processing regions 6, are conceivable and encompass the solution according to the invention.

Therefore, the following is a summary:

The invention relates to a fluidized bed apparatus for batch-by-batch or continuous process control.

The object of the invention is to configure a fluidized bed apparatus for batch-by-batch or continuous process control and a method for operating a fluidized bed apparatus of the type described in the introduction, such that the process in the fluidization region is influenced as desired, especially in terms of material movement and dwell time.

According to the invention, this is achieved in that the fluidized bed apparatus is formed from at least two processing regions and the processing regions are connected to each other by overflow channels and the first processing region is provided with a solids inlet and the last processing region is provided with a solids outlet. For influencing the dwell time, the material to be treated is supplied to at least two processing regions one after the other and passes through these regions, wherein the material transport direction is realized relative to the flow of the fluidization means in the cross flow.

The invention claimed is:

1. A fluidized bed apparatus for batch-by-batch or continuous process control, comprising:
   an air inlet chamber, a fluidization region, and a gas outlet,
   at least two processing regions (6), each including two gas flow devices in a region between the air inlet chamber and the fluidization region for supplying fluidization means, and each of the processing regions (6) having corresponding pairs of jet inlet walls and jet return flow walls, as well as the side walls, the corresponding pairs of jet inlet walls and the jet return flow walls are inclined relative to vertical such that they each form a cone,
   an expanded cross section of the fluidized bed apparatus located above the jet inlet walls and jet return flow walls, where the outlet for outgoing air is arranged,
   the processing regions (6) are connected to each other by at least one overflow channel (5) and a first of the processing regions (6) is provided with a solids inlet (13) and a last of the processing regions (6) is provided with a solids outlet (7).

2. Fluidized bed apparatus according to claim 1, wherein the at least one overflow channel (5) is arranged in adjacent jet return flow walls (2) of processing regions (6) arranged one next to the other and formed by channels or cross-sectional openings.

3. Fluidized bed apparatus according to claim 1, wherein the individual processing regions (6) are arranged one after the other and/or one next to the other.

4. Fluidized bed apparatus according to claim 1, wherein sizes of the individual processing regions (6) are different.

5. Fluidized bed apparatus according to claim 1, wherein the individual processing regions (6) are separated from each other in a region of the air inlet chambers (8) by segmentations (4).

6. Fluidized bed apparatus according to claim 1, wherein the solids inlet (13) is arranged in a first of the processing regions (6) at an end or at a longitudinal side of the jet return flow wall (2).

7. Fluidized bed apparatus according to claim 1, wherein the at least one overflow channel (5) comprises separate overflow channels arranged between the individual processing regions (6) so that the material is transported in a meander-like fashion through the individual processing regions (6) of the fluidized bed apparatus.

8. Fluidized bed apparatus according to claim 1, wherein the individual processing regions (6) are the same size.

* * * * *